UNITED STATES PATENT OFFICE.

LEONARD BROCKETT, OF WEST HAVEN, ASSIGNOR TO HIMSELF AND DAVID I. STILLSON, OF ANSONIA, CONNECTICUT.

IMPROVEMENT IN SOAP.

Specification forming part of Letters Patent No. 104,549, dated June 21, 1870.

*To all whom it may concern:*

Be it known that I, LEONARD BROCKETT, of West Haven, in the county of New Haven and State of Connecticut, have invented a new Improvement in Soap; and I do hereby declare the following to be a full, clear, and exact description of the same.

This invention relates to an improvement in soap for laundry and similar purposes; and it consists in the combination of the ingredients in the proportions substantially as hereinafter named.

I first make what I term "rosin-soap," and this I do in the following manner: To four gallons of water I add nine pounds of concentrated lye, and this stands for about twelve hours, or until the lye is thoroughly dissolved and mingled with the water. I then add ten pounds of rosin, and when thoroughly dissolved add twenty-eight pounds of grease, and this I allow to stand until the grease is entirely taken up. I then add about sixteen gallons of water, and boil slowly from five to eight hours, and when thoroughly cool the rosin-soap is complete. I then take one hundred and forty pounds of this soap, cut it up in five gallons of water, add twelve pounds of sal-soda, and heat until the soap is thoroughly melted; then add one pound of borax and six ounces of hartshorn, and boil for about two hours. This, after standing three days, more or less, I cut into bars, and it is ready for market.

The proportions may be slightly varied, as may also the manner of combining the ingredients.

I claim as my invention—

The soap composed of the ingredients, in the proportions, and in the manner substantially as herein set forth.

LEONARD BROCKETT.

Witnesses:
A. J. TIBBITS,
J. H. SHUMWAY.